July 18, 1939.   H. L. McFEATERS   2,166,663
OPERATING MECHANISM FOR TILTING RECEPTACLES
Filed Oct. 27, 1938   2 Sheets—Sheet 1

INVENTOR
Harry L. McFeaters
By Green & McCallister
His Attorneys

July 18, 1939.  H. L. McFEATERS  2,166,663
OPERATING MECHANISM FOR TILTING RECEPTACLES
Filed Oct. 27, 1938  2 Sheets-Sheet 2

INVENTOR
Harry L. McFeaters
By Green & McAllister
His Attorneys

Patented July 18, 1939

2,166,663

UNITED STATES PATENT OFFICE 2,166,663

OPERATING MECHANISM FOR TILTING RECEPTACLES

Harry L. McFeaters, New Castle, Pa., assignor to Pennsylvania Engineering Works, a corporation of Pennsylvania Application October 27, 1938, Serial No. 237,263

4 Claims. (Cl. 266—39)

This invention relates to tiltable receptacles such as hot metal mixers, open hearth furnaces, etc., and more particularly to mechanism for tilting and restoring or righting such receptacles.

Mechanisms for tilting and restoring tiltable receptacles such as hot metal mixers, open hearth furnaces and the like commonly employ a power driven screw shaft, a reciprocating crosshead, a nut carried by said crosshead and meshing with the threads of said screw shaft, and rods for operatively connecting said crosshead to the receptacle whereby the same may be tilted and restored or righted upon proper rotation of said screw shaft.

It frequently happens that due to faulty lubrication or lack of inspection at regular intervals, the nut which meshes with the threads of the operating screw shaft shears off during operation and an object of this invention is to provide in an operating mechanism such as above set forth a safety or emergency nut which carries no load during normal operations, but which upon failure of the main nut immediately comes into action thereby permitting the mechanism to temporarily function to either tilt, restore or lock the receptacle in normal position.

This, as well as other objects which will be apparent to those skilled in this art, I attain by means of the mechanism described in the specification and illustrated in the drawings accompanying and forming part of this application and in which Figure 1 is a more or less diagrammatic view of a hot metal mixer equipped with an operating mechanism embodying this invention;

Figure 1:
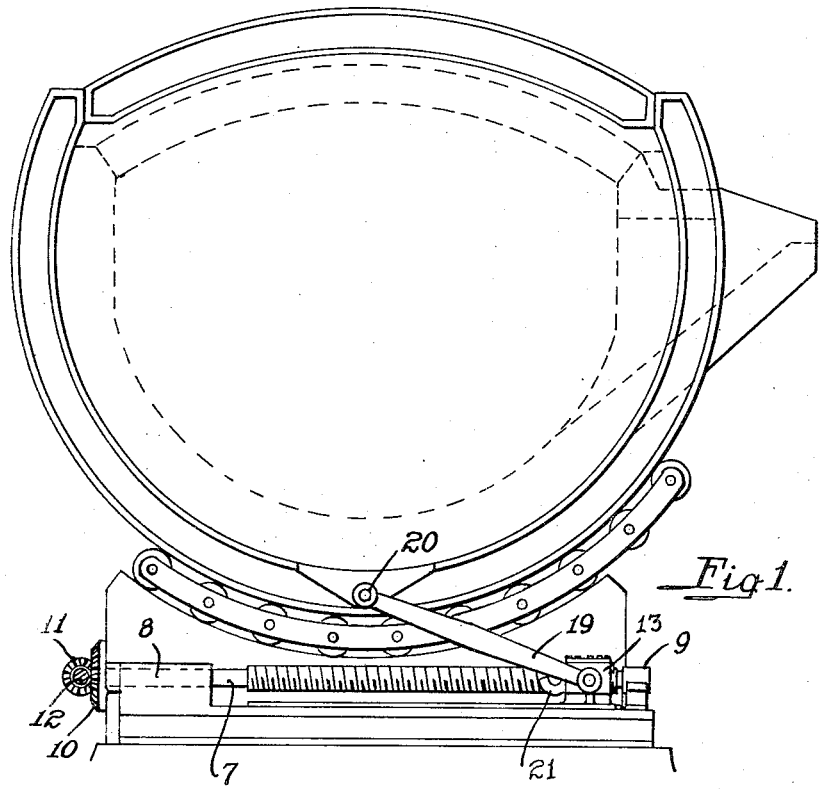

The operating mechanism of this invention comprises a horizontal screw shaft 7 suitably journaled in bearings 8 and 9. One end of this shaft carries a gear 10 which meshes with a gear 11 mounted on a motor driven shaft 12; the motor not being shown. A crosshead 13 which is provided with laterally extending trunnions 14—14 is mounted for reciprocation longitudinally of the screw shaft and within a suitable crosshead guide 15 located therebeneath. A nut 16, which I term the main nut, is rigidly secured in position within the crosshead by means of a keyed cover plate 17 and this nut meshes with the threads of screw shaft 7. The cover plate is secured in place by means of bolts 18.

Connecting rods 19 are located on opposite sides of the crosshead and each has one end connected to a crosshead trunnion 14 and the other end to the mixer as at 20.

Figure 2:
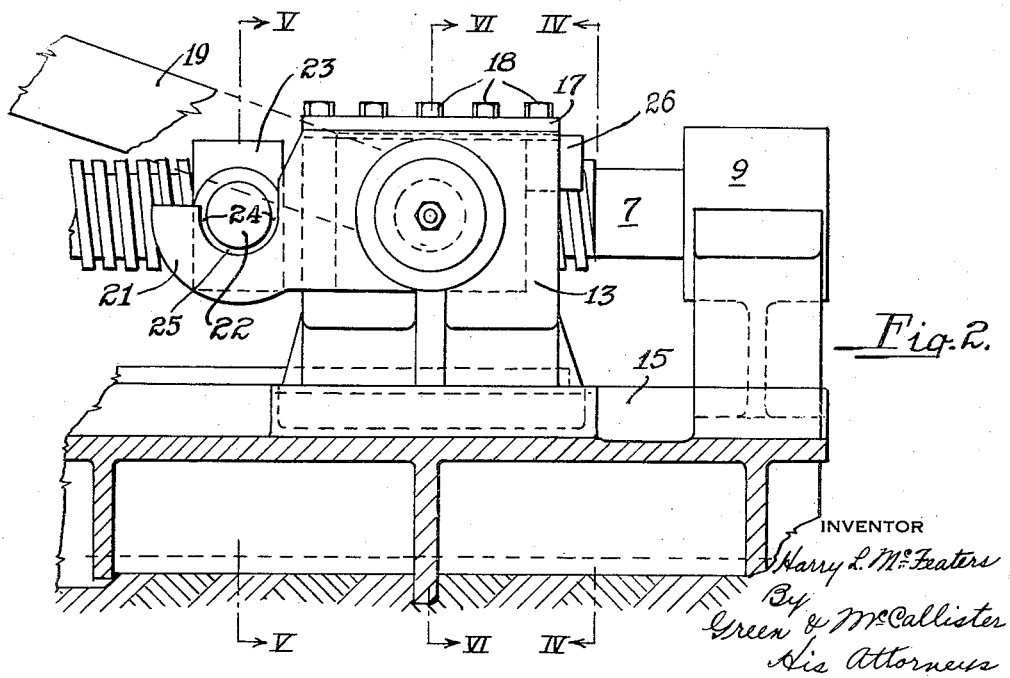
Fig. 2 is a side view in elevation of part of the operating mechanism of Fig. 1.
Figure 3:
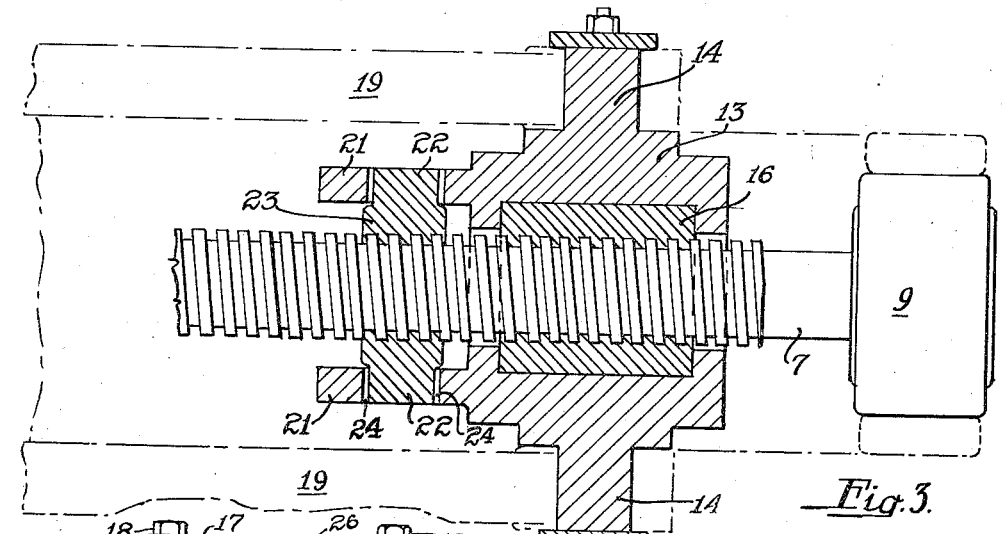
Fig. 3 is a view partially in top plan and partially in section of that portion of the mechanism illustrated in Fig. 2.
Figure 4:
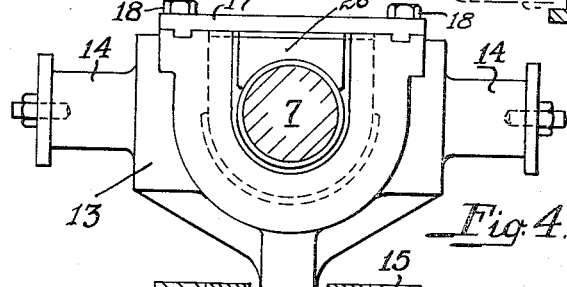
Figs. 4, 5 and 6 are views taken on lines IV—IV, V—V and VI—VI, respectively, of Fig. 2.
Figure 5:
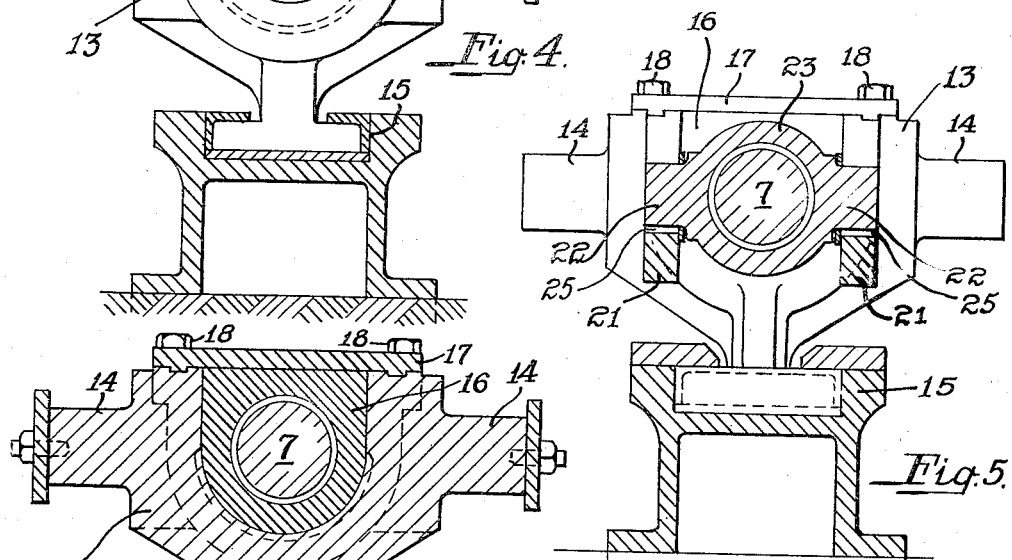
Figure 6:
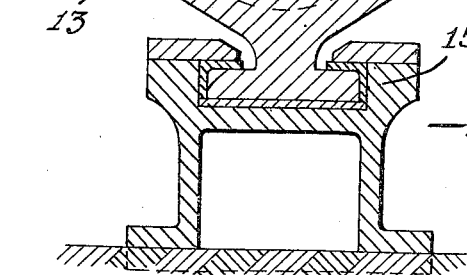

Crosshead 13 is provided with spaced ears 21—21 which are provided with circular pocket-like recesses formed for the reception of trunnions 22—22 of an emergency or safety nut 23. These pockets are of greater diameter than the safety nut trunnions in order to provide substantial side clearances 24—24 (Fig. 3) and a substantial bottom clearance 25 (Figs. 2 and 5) between the trunnions and the walls of said pockets.

The safety nut meshes with the threads of screw shaft 7 but because of the substantial side clearances between its trunnions and the side surfaces of the pockets in ears 21—21, a lost motion connection is provided between this nut and the crosshead. Such lost motion connection permits the safety nut to idle during normal operation of the crosshead along the screw shaft and prevents the emergency or safety nut from normally carrying any load. The clearance between the safety nut trunnions and the pockets in ears 21—21 allows for wear of main nut 16.

In case the main nut 16 due to lack of lubrication or for any other cause becomes broken or sheared off, the safety or emergency nut 23 will immediately come into operation and function as the operative connection between the screw shaft and the crosshead. In other words, it becomes an operative part of the mechanism. It will further be seen that if and when such an emergency occurs, the mechanism can be relied on to hold the vessel in the position it is in when the accident occurs, to tilt the vessel to pouring position or to restore or right the vessel to normal position.

Main nut 16 on its end opposite from the safety or emergency nut is provided with an extension 26 that engages only the upper portion of screw shaft 7 (about 45°). Such a construction is disclosed in Patent No. 1,678,455 and permits of easy inspection for the purpose of determining whether or not the thread of the main nut has become worn.

Having thus described my invention, what I claim as new and desire to secure by Letters Patent is:

1. In a mechanism for operating tiltable receptacles, a power operated screw shaft, a crosshead mounted for reciprocation parallel to the longitudinal axis of said shaft, a main operating nut meshing with said screw shaft and rigidly secured to said crosshead, means for operatively connecting the crosshead to the tiltable vessel to be operated and an emergency nut also meshing with said screw shaft and being loosely carried by said crosshead whereby it idles during normal operation of the main nut and comes into immediate operation as an operative part of the mechanism upon failure of the main nut.

2. In a mechanism for operating tiltable receptacles, a rotatable screw shaft, a crosshead constructed to receive a main nut and having an extension adapted to loosely receive an emergency or safety nut, a main nut meshing with said screw shaft, means rigidly securing said nut to said crosshead, means for operatively connecting said crosshead to the vessel to be operated and an emergency nut also meshing with said screw shaft and loosely located within said crosshead whereby it idles during normal operation of the main nut and comes into operation as an operative part of the mechanism upon failure of the main nut.

3. In a mechanism for operating tiltable receptacles, a horizontal power operated screw shaft, a crosshead mounted for reciprocation parallel to and below said shaft, a main operating nut meshing with said screw shaft and rigidly secured to said crosshead, means for operatively connecting the crosshead to the tiltable vessel to be operated and an emergency nut also meshing with said screw shaft and having a lost motion connection with said crosshead whereby it idles during normal operation of the main nut and comes into immediate operation as an operative part of the mechanism upon failure of the main nut.

4. In a mechanism for operating tiltable receptacles, a rotatable screw shaft, a crosshead constructed to receive a main nut and having spaced extensions for loosely receiving the trunnions of an emergency or safety nut, a main nut rigidly connected to said crosshead and meshing with said screw shaft, means for operatively connecting said crosshead to the vessel to be operated and an emergency nut also meshing with said screw shaft and being provided with trunnions which are loosely located within said crosshead extensions whereby the emergency nut idles during normal operation of the main nut and comes into operation as an operative part of the mechanism upon failure of the main nut.

HARRY L. McFEATERS.